July 30, 1935. A. MOLDENHAUER 2,009,810
SPLIT RIM AND RIM OPERATING DEVICE
Filed July 6, 1931
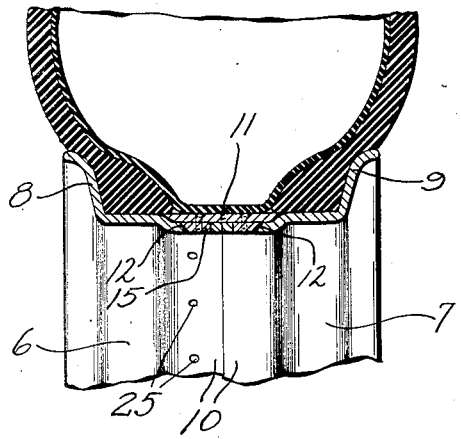
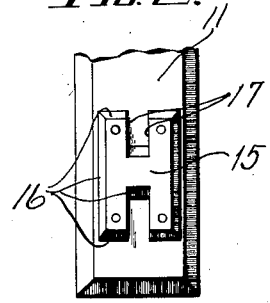
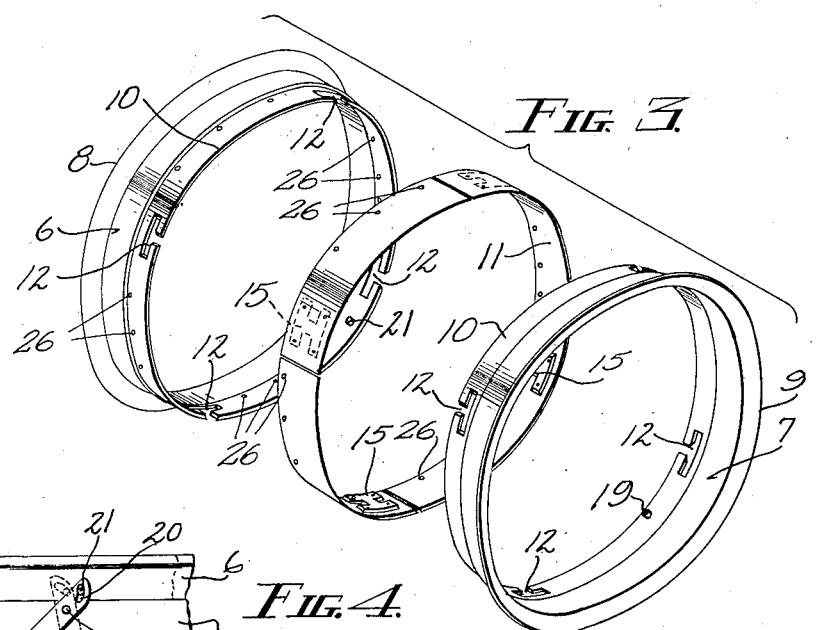
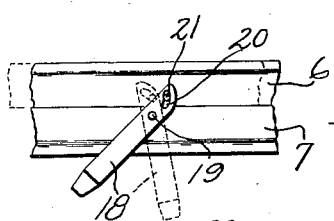
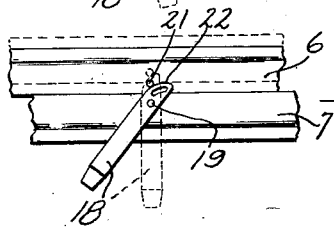
INVENTOR
Arnold Moldenhauer
BY
Wheeler, Wheeler & Wheeler
ATTORNEYS Patented July 30, 1935

2,009,810

UNITED STATES PATENT OFFICE 2,009,810

SPLIT RIM AND RIM OPERATING DEVICE

Arnold Moldenhauer, Milwaukee, Wis.

Application July 6, 1931, Serial No. 548,879

7 Claims. (Cl. 301—35)

This invention relates to improvements in split rims and rim operating devices.

It is the object of the invention to provide a novel and improved split rim comprising a pair of like peripheral bead members, a connecting band, an interlocking means adapted for operation in a locking direction by a relative axial movement of the parts and in an unlocking direction by a relative rotative movement of the parts.

It is my further object to provide a rim which may be unlocked and separation of its component parts effected by a simple manipulation of a convenient operating lever.

In the drawing:

Figure 1 is a fragmentary detail in cross section through a portion of a split rim embodying the invention.

Figure 2 is a fragmentary detail view in plan of a portion of the split ring employed to unite the component bead elements of the rim.

Figure 3 is a view on a reduced scale showing in perspective the three component parts of the rim as they appear when separated.

Figure 4 is a fragmentary detail in plan showing the unlocking movement effected by manipulation of the control lever.

Figure 5 is a view similar to Figure 4 showing the application of the control lever for separating the parts in an axial direction.

Like parts are identified by the same reference characters throughout the several views.

The rim comprises two component bead elements 6 and 7 having bead portions 8 and 9 respectively and peripherally joined upon the central plane of the rim. The adjacent marginal portions 10 of the two bead elements are radially formed to provide a channel into which the split ring 11 is receivable.

Each of the bead elements 6 and 7 is provided at intervals about the periphery of its radially inwardly formed portion 10 with T-shaped slots 12 opening to the margins. The split ring 11 carries complementary interlocking bosses 15 which are similar in form to a figure H, each half of which is receivable into one of the slots 12 of one of the bead elements. The complementary surfaces of the bosses 15 and slots 12 are all beveled as shown at 16 in Fig. 2 with the exception of those surfaces which oppose an axial separation of the interlocked parts. Thus, the margins 17 of the boss, and the corresponding margins of the slots, are disposed in radial planes normal to the axis of the rim.

Because of the beveled surfaces provided at 16 it is possible to assemble the bead elements 6 and 7 upon the split ring 11 by a simple relative axial movement of the parts. With the slots in registry with the bosses of the split ring as shown in Fig. 3, the initial entering movement of the marginal portions 10 of the bead elements spreads the split ring until complete registration between the bosses and slots is effected, whereupon the bosses drop into the slots and the split ring resiliently closes to cover the joint and protect the casing and tube from becoming pinched therein.

Due to the right angle shoulders at 17 on the bosses, however, the rim parts cannot be separated by relative axial movement until the bosses are first released by a radial movement from interlocking engagement in the respective slots. This is preferably accomplished by relative rotation of the parts as shown in Fig. 4. A control lever 18 is fulcrumed on a pin projecting at 19 from bead element 7, and a slot 20 in the lever is engaged over a second pin 21 in bead element 6. Thereupon the movement of the lever from the full line position illustrated in Fig. 4 to the dotted line position in that view will cause relative peripheral rotation of rim element 6 from its full line position to its dotted line position.

The manipulation of lever 18 illustrated in Fig. 4 brings pins 19 and 20 directly opposite one another. Thereupon the lever is inverted on pin 19 as shown in Fig. 5, and its cam-like surface at 22 is engaged behind pin 21 so that when the lever is again moved from full to dotted line positions shown in Fig. 5 it will exert an axial thrust on rim element 6 to separate the rims by movement to the relative positions shown in dotted lines.

While the split ring 11 may be made in one piece if desired, I prefer to make it up in a number of sectors as shown in Fig. 3, each sector carrying one of the bosses 15 and being free to spring radially at the end to which the boss is applied. The other end of the sector may then be fastened by rivets 25 or welded or otherwise secured to the bead element 6, the rivets being shown in Fig. 1 and the holes 26 therefor in Fig. 3. The reason for preferably dividing the ring 11 into sectors is to render more symmetrical the radial deflection of the ring parts when the interlocking bosses 15 are to be freed from the complementary slots 12. If the ring had but one split or transverse line of division its ability to yield at such line would be excessive as compared with its ability to yield at a point intermediate its split ends. By virtue of the arrangement disclosed, the free end of each component part of the split ring 11 will have the same radial yielding movement as each other part and the ease of operation of the device is enhanced.

As shown, the arrangement is such that the spring arms which comprise sectors of the split ring 11 must yield outwardly of the rim toward the casing and tube in order to permit the locking devices 15 to release the component parts of the rim. Thus when the inner tube is inflated, its pressure resists the release of the locking devices, but when the tube is deflated the locking devices are readily manipulated.

I claim:

1. A split rim comprising circumferentially united bead elements and a split ring telescopically related to said bead elements, said ring and elements having complementary interlocking parts arranged in pairs, one part in each pair being radially yieldable and said parts having complementary portions beveled to cause the yielding of one part of each pair upon a peripheral rotation of a bead element respecting said arrangement and upon an axial movement of a bead element toward said ring in a locking direction, said parts being shouldered to resist relative separation upon an axial movement in an unlocking direction.

2. A split rim comprising the combination with annular bead elements and a split ring telescopically related thereto, each of said bead elements having slots about their margins complementary to the slots of the other element and said ring having bosses complementary to said slots, the complementary surfaces of said bosses and said margins being engageable in the course of relative axial movement of said elements toward each other and being beveled in a rotative direction respecting each other, and the complementary portions of said bosses and slots engageable in opposition to the axial separation of said elements being abruptly shouldered.

3. A split rim comprising the combination with annular bead elements, of a split ring comprising arcuate sections overlapping said elements and secured at their ends to one of said elements, interlocking means carried by the free ends of said sectors, and means on the other of said elements with which the respective interlocking means are engageable, said interlocking means and said other elements having complementary portions resisting axial separation of said elements and adapted to displace said interlocking means in a radial direction upon relative rotative movement between said elements and upon relative axial movement of said elements toward each other.

4. In a split rim, the combination with a pair of complementary annular bead elements each provided with an annular cylindrical portion adjacent the cylindrical portion of the other element and radially formed to provide an annular depression upon the said cylindrical portions, said cylindrical portions having complementary T-shaped slots in said depression comprising H-shaped slots when in registry, of a split ring comprising a plurality of arcuate sections disposed end to end in said depression and each having a portion secured to one of said elements and one end disposed above an adjacent H-shaped slot and freely movable radially therefrom, and an H-shaped boss on each of said sections receivable in said H-shaped slots, whereby said annular bead elements may be detachably secured together.

5. In a split rim, the combination with a pair of complementary annular bead elements each provided with an annular cylindrical portion adjacent the cylindrical portion of the other element and radially formed to provide an annular depression upon the said cylindrical portions, said cylindrical portions having complementary T-shaped slots in said depression comprising H-shaped slots when in registry, of a split ring comprising a plurality of arcuate sections disposed end to end in said depression and each having a portion secured to one of said elements and one end disposed above an adjacent H-shaped slot and freely movable radially therefrom, and an H-shaped boss on each of said sections receivable in said H-shaped slots, whereby said annular bead elements may be detachably secured together, said H-shaped slots and bosses having complementary beveled edges serving as cam surfaces and complementary radially disposed surfaces serving as locking faces, whereby rotation of the annular bead elements relative to each other will remove the H-shaped bosses from the H-shaped slots and whereby when the bosses are disposed in the slots, axial movement of the annular bead elements relative to each other will be prevented.

6. A rim comprising the combination with annular bead elements having abutting margins and offset toward the center of the rim adjacent said margins, each of said elements having a lock engaging recess near said margins, of a locking device engageable in both of said recesses for the connection of said bead elements, and an arm carrying said locking device and extending circumferentially of said bead elements upon the offset portions thereof and connected at its end with one of said bead elements, whereby disengagement of said locking device will be opposed by the pressure of a tire mounted on said rim.

7. A split rim comprising a pair of annular bead elements having tire engaging flanges extending outwardly and provided between said flanges with rim portions designed for substantial abutment, of outwardly yieldable circumferentially extending means on the outside of and connected with one of said rim portions between said flanges, locking means carried by said outwardly yieldable means, said locking means and both of said rim portions being adapted for interlocking engagement whereby to connect said rim portions independently of said yieldable means, said locking engagement being releasable upon the outward movement of said yieldable means, said yieldable means being positioned to be covered by a tire applied to said rim, whereby the inflation of such a tire will oppose the release of said locking means.

ARNOLD MOLDENHAUER.